Jan. 22, 1952 — M. WINTERHALTER — 2,583,035

SLIDING CLASP FASTENER

Filed Jan. 11, 1949 — 5 Sheets-Sheet 1

Martin Winterhalter, Inventor

Jan. 22, 1952   M. WINTERHALTER   2,583,035
SLIDING CLASP FASTENER
Filed Jan. 11, 1949   5 Sheets-Sheet 2

Jan. 22, 1952 M. WINTERHALTER 2,583,035
SLIDING CLASP FASTENER
Filed Jan. 11, 1949 5 Sheets-Sheet 3

Martin Winterhalter Inventor
By
Emery Booth Townsend Miller & Weidner Attorney

Jan. 22, 1952 — M. WINTERHALTER — 2,583,035
SLIDING CLASP FASTENER
Filed Jan. 11, 1949 — 5 Sheets-Sheet 4

Jan. 22, 1952  M. WINTERHALTER  2,583,035
SLIDING CLASP FASTENER

Filed Jan. 11, 1949  5 Sheets-Sheet 5

Martin Winterhalter Inventor

By

Emery Booth Townsend Miller + Neidner Attorney

Patented Jan. 22, 1952

2,583,035

UNITED STATES PATENT OFFICE 2,583,035

SLIDING CLASP FASTENER

Martin Winterhalter, Morcote, Switzerland

Application January 11, 1949, Serial No. 70,182
In Great Britain February 11, 1948

2 Claims. (Cl. 24—205.13)

The present invention relates to sliding clasp fasteners of the kind in which the fastener members are formed in situ around an edge of a tape or around another flexible carrier, such as cord or string. Such fastener members may be die-cast from a suitable metal or metal alloy such as zinc or zinc alloy, or may be moulded by injection moulding from non-metallic plastic material.

Known fasteners of this kind suffer from the drawback that, particularly when the fastener members are kept small in order to reduce the weight of the sliding clasp fastener, the surfaces of contact between the legs of the fastener members and the carrier are small so that, in use, the members are liable to become detached from the carrier. It has already been proposed to avoid this drawback by increasing the width of the members, that is to say their dimension in the longitudinal direction of the carrier. This, however, is in many cases undesirable, for example when the fastener is intended to be used in connection with blouses, dainty ladies' dresses and underwear, since the fastener becomes too bulky and loses its neat appearance. It is an object of the present invention to overcome this difficulty and to provide a sliding clasp fastener of the kind described in which the seating of the fastener members on the tape or the like is improved without unduly increasing the weight of the fastener.

In connection with fasteners having metallic members, it is often required to provide the members with a suitable colour in order to improve the appearance of the fastener. In particular, with fasteners having members of zinc or zinc alloy, it is known electrolytically to oxidize the surfaces of the members and subsequently to dye the oxidized surfaces. In order to provide an electrically conducting connection between the members of a row of fastener members, it is known to weave or otherwise to attach a metallic thread or metallic threads in or to the carrier, so that the members are in electric contact with the thread or threads. However, in order to retain the required high flexibility of the carrier, such metallic threads have to be very thin and therefore offer a comparatively high ohmic resistance to the electric current. Moreover, when the electrolytic treatment commences, the surface of the thread becomes oxidized and the electric contact between the thread or threads and the members is soon disturbed or interrupted, rendering a further electrolytical treatment difficult or impossible. In the case of fasteners having metallic members which are intended to be treated electrolytically, it is another object of the invention to provide electrical conductors between the members and integral therewith, the cross-sections of the conductors being so large as to render the ohmic resistance sufficiently low. Furthermore, since the conductors are integral with the members, oxidization of the surfaces of the conductors does not substantially interfere with the electrolytical treatment. The conductors may be removed when the electrolytical treatment has been completed, or if no such treatment is required.

Sliding clasp fasteners having cast or moulded fastener members are usually made by means of a mould having a longitudinal channel at its centre for enabling the liquefied material from which the members are made to flow from the channel towards a row of cavities, in which the individual members are formed. Usually, two rows of individual members corresponding to the two stringers of a fastener are formed simultaneously, the two rows being arranged one at each side of the channel with the head portions of the members (that is that portion of each member which carries the coupling recess and projection) facing the channel. The parts of the cavities nearest the channel are connected thereto by branch channels. After the rows of fastener elements have been formed and solidified, the material corresponding to the channel and the branch channels is broken or cut away, leaving burrs and similar irregularities on the head portions of the members. These burrs and the like have to be removed by a finishing process such as brushing or polishing. Since the head portions carry the small coupling recesses and projections, whose dimensions have to be kept within very narrow limits in order to ensure a proper working of the fastener, the danger exists that the coupling projections and recesses are damaged while the head portions are brushed or polished, whereby the working of the fastener may be impaired. It is another object of the present invention to avoid this drawback.

It is still a further object of the present invention to provide a tapeless sliding clasp fastener, that is to say a fastener in which the usual tapes of textile material are dispensed with and are replaced by webs of metal or plastic material which can be cast or moulded simultaneously with the rows of fastener members, which each are seated on a flexible cord, string, or the like which is substantially non-elastic in its longitudinal direction.

The present invention is based on the idea of providing the legs of the fastener members with thin extensions projecting laterally beyond the legs whereby to improve the seating of the members on the tape if such tape is provided. With regard to the manufacture of such fasteners, the invention is based on the idea of connecting the legs instead of the head portions of the cavities for forming the members in a mould to a central channel by branch channels so that the liquefied material from which the members are being made flows from the legs to the head portions instead of from the head portions to the legs. In the case of a fastener comprising a tape, this entails that the liquefied material has to be fed across the tape. The material in the branch channels, after having solidified, forms a web of metal or plastic material, which may either be broken away or may, wholly or in part, remain on the tape and may be anchored thereon. In the latter case, the cross-section of the cast or moulded web is kept sufficiently small so as to render the web flexible. In the case of a tapeless fastener, the web replaces the tape and offers a means for securing the fastener to an article in connection with which it is to be used. In the case of a fastener comprising a tape, the provision of the web offers a number of advantages which will be referred to in detail further below.

According to the present invention, in a sliding clasp fastener comprising a row of fastener members cast or moulded in situ around a tape or other flexible carrier, such as a cord or string, the legs of the members are provided with extensions of smaller thickness than the legs, the said extensions projecting laterally beyond the legs. In the case of a fastener comprising a tape, these extensions improve the seating of the fastener members without rendering the fastener too bulky and without unduly increasing the weight of the fastener.

The invention also consists in a tapeless sliding clasp fastener comprising a row of fastener members cast or moulded in situ around a flexible cord or string which is substantially non-elastic in its longitudinal direction wherein the legs of the members are provided with extensions of smaller thickness than the legs and the extensions of adjacent fastener members are interconnected by a web of cast or moulded material.

A mould according to the invention for casting or moulding fastener members of a sliding clasp fastener around a tape or another flexible carrier such as a cord or string, comprises a recess for receiving the carrier, a row of cavities constructed and arranged so as to correspond to a row of fastener members on said carrier, a main channel communicating with the outside of the mould for introducing liquefied material from which the members are being made into the mould, and a plurality of branch channels communicating with said main channel and with said cavities at those regions thereof which correspond to the legs of the fastener members to be made.

In a method according to the invention of making sliding clasp fasteners by casting or moulding a row of fastener members around a tape or another flexible carrier such as a cord or string, liquefied material from which the members are being made is caused to flow in the direction from the legs of the members which are being manufactured towards their head portions.

To make the invention clearly understood, reference will now be made to the accompanying drawings, which are given by way of example only and in which:—

Figure 1:
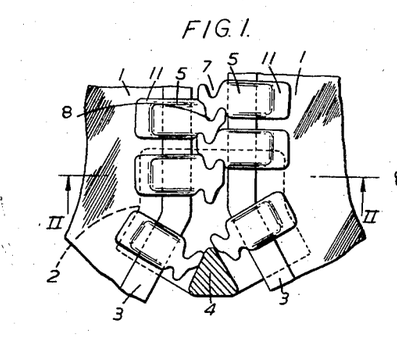
Fig. 1 serves explanatory purposes and illustrates part of a sliding clasp fastener.
Figure 2:
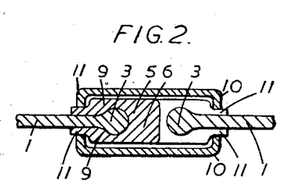
Fig. 2 is a sectional view along the line II—II of Fig. 1.
Figure 3:
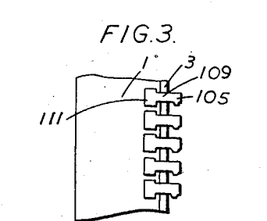
Fig. 3 illustrates part of a stringer of a sliding clasp fastener of the invention.
Figure 20:
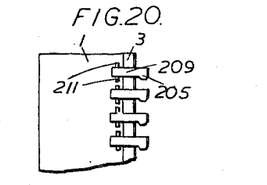
Fig. 20 illustrates part of a stringer of a sliding clasp fastener produced by the mould of Figs. 17, 18, and 19.

Referring now to the drawings, the sliding clasp fastener illustrated in Figs. 1 and 2 comprises two stringers each including a tape 1 provided with a thickened edge 3 around which fastener members 5 are formed in situ. The fastener members 5 may be made of thermoplastic material and moulded around the edge 3 of the tape 1 by injection moulding or they may be made of a suitable metal or metal alloy, such as zinc or zinc alloy, and cast around the edge 3 of the tape 1 by die-casting. Each member 5 comprises a head portion 6 (see Fig. 2) provided with a coupling recess 7 and a coupling projection 8 (see Fig. 1) of any suitable shape, and two legs 9 gripping the thickened edge 3 of the respective tape 1 between them. For closing and opening the fastener, a slider 2 is provided comprising, in known manner, two spaced wings 10 held together by a connecting piece 4. The legs 9 of each member 5 are provided with extensions 11 anchored in the respective tape. As shown in Fig. 2, the extensions 11 are of smaller thickness (that is the dimension perpendicular to the plane of the tape 1) than the legs 9. The extensions may have various shapes and may be provided at various parts of the legs. In the embodiment of Figs. 1 and 2, the extensions 11 are provided at the end of the legs 9 and are substantially of the same width (that is the dimension in the direction of the tape edge) as the legs 9. In the embodiment of Fig. 3, the width of the extensions 111 is greater than that of the legs 109 of the fastener member 105 whereby the seating of the members 105 on the respective tape 1 is improved, while the extensions 111 are of smaller thickness than the legs 109 in order not unduly to increase the weight of the fastener. In the embodiment of Fig. 20, the extensions 211 extend laterally from the legs 209 of the fastener members 203 and are of smaller thickness than the legs 209.

In the case of the sliding clasp fastener illustrated in Figs. 1 and 2 (and also in the case of the fastener illustrated in Fig. 3), the slider 2 rides on the extensions 11 (or 111 of Fig. 3) as shown in Fig. 2. This has the additional advantage that the inturned edges of the wings 10 of the slider 2 do not contact the tape 1, as is otherwise usual, whereby in use the tape is prevented from being damaged or worn off by the moving slider. Moreover, since the surfaces of the extensions 11 (or 111) are smooth, the slider may be more easily operated than when it moves across the tapes having comparatively rough surfaces.

Figs. 4 to 8, which will now be described, illustrate a mould for making sliding clasp fasteners comprising stringers of the kind illustrated in Fig. 3. However, the mould may, with a slight modification to be described further below, be used for making sliding clasp fasteners illustrated in Figs. 1 and 2.

Figure 4:
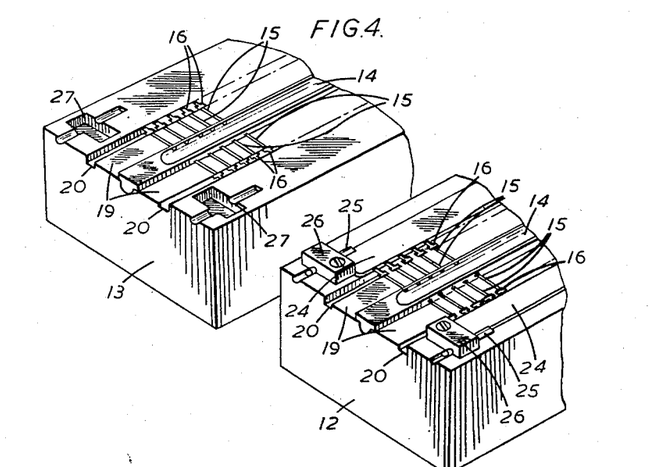
Fig. 4 is a perspective view of a portion of two parts of a mould for making sliding clasp fasteners.
Figure 5:
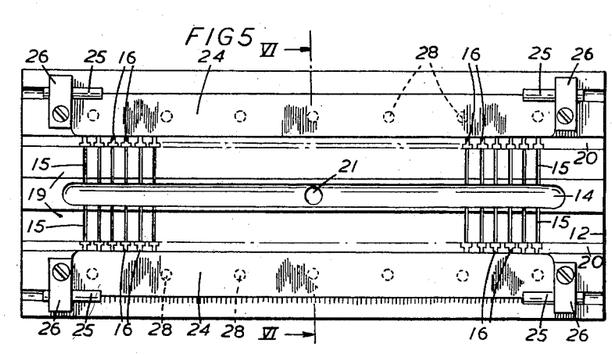
Fig. 5 is a top plan view of one of the mould parts illustrated in Fig. 4.
Figure 6:
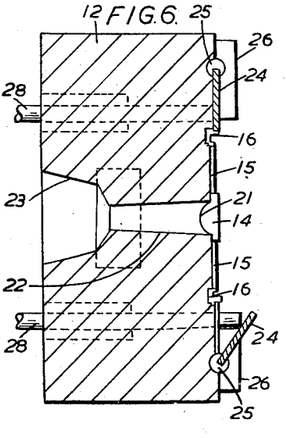
Fig. 6 is a sectional view on an enlarged scale along the line VI—VI of Fig. 5, one of the means for ejecting the fastener being shown in a position different from that shown in Fig. 5.
Figure 7:
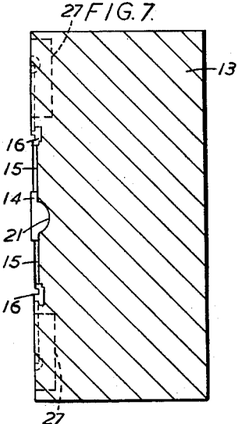
Fig. 7 is a similar sectional view through the other mould part illustrated in Fig. 4.
Figure 8:
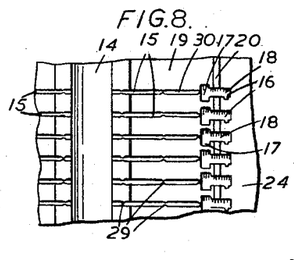
Fig. 8 illustrates, somewhat diagrammatically, a portion of Fig. 5 on an enlarged scale.

The mould comprises two mould parts 12 and 13, which are illustrated side by side in Fig. 4. Each mould part has, at its front, that is to say at its upper surface when positioned as shown in Fig. 4, a main channel 14 extending in the longitudinal direction of the mould parts. When the mould parts 12 and 13 are joined together so that the front of one mould part faces that of the other, the two main channels register with each other and form a longitudinal single channel. Each mould part has two recesses 19 extending in the longitudinal direction of the mould parts, one at each side of the main channel 14. The recesses 19 of one mould part register with the corresponding recesses 19 of the other mould part when the two mould parts are joined together and form two spaces for receiving two tapes, one in each such space. Each mould part has two grooves 20, one at each side of the main channel 14 and parallel thereto, of greater depth than the recesses 19 and immediately adjacent thereto. The respective grooves of the two mould parts 12 and 13 register with each other when the mould parts are joined together and serve for accommodating the thickened edge 3 of a fastener tape 1 (Fig. 3). Each of the grooves 20 is provided with a row of similarly shaped notches 16 extending somewhat into the respective recesses 19. Corresponding notches 16 of the two mould parts 12 and 13 register with each other, when the mould parts are joined together. The registering notches at each side of the longitudinal channel form a row of cavities corresponding in their shape and arrangement to, and serving for the formation of, a row of fastener members 105 (Fig. 3). In particular, each notch 16 includes a portion 17, as can best be seen from Fig. 8, which corresponds to an extension 111 of a fastener member 105, and a portion 18 which communicates with the portion 17 and which corresponds to a leg 109 of such member, the portion 17 being wider but shallower than the portion 18. Within each recess 19 of each mould part 12 and 13, branch channels 15 are provided. When the tapes are inserted and the mould parts joined together, the tapes separate the branch channels of one mould part from those of the other. The branch channels 15 communicate with the respective main channel 14 and with the cavities or notches 16 for forming the fastener members. It will easily be understood that the branch channels 15 extend across the respective tape surfaces and communicate with the cavities or notches 16 at their respective shallow portions 17. The main channel 14 of the mould part 12 has an inlet 21 (see Fig. 5) leading to a duct 22 (see Fig. 6) having a funnel-shaped part 23 communicating with the outside of the mould part 12 at the rear thereof for introducing liquefied thermoplastic or metallic material into the mould. The mould part 12 comprises two metal bands 24 whose edges facing the main channel 14 extend slightly into the region of the respective notches 16. The metal bands 24 are rotatably connected to the mould part 12 by hinges 25 held in brackets 26. The mould part 13 has suitably shaped recesses 27 for accommodating the hinges 25 and brackets 26 when the mould parts are joined together; the recesses 27 in co-operation with the hinges 25 and the brackets 26 also serve for securing the mould parts in their required relative position, in which the main channels 14, the respective branch channels 15 and the respective notches 16 register with one another. A plurality of ejector rods 28 are slidably arranged in the mould part 12 so that one end of each rod bears against one of the metal bands 24 while the other end of the rod protrudes from the rear of the mould part 12 as is clearly shown in Fig. 6. When a metal band 24 is initially in the position shown in the upper part of Fig. 6, in which it lies flat against the front of the mould part 12, and when subsequently the ends of the rods 28 protruding from the rear of the mould part 12 are pushed towards the front thereof, the respective metal band 24 is rotated around its hinges 25 and assumes the position shown in the lower part of Fig. 6 in which the metal band 24 is inclined relatively to the front of the mould part 12. Each branch channel 15 is provided with three constrictions 29 as shown in Fig. 8 (the constrictions 29 being, for clarity's sake, omitted from Figs. 4 to 7). Suitable means (not shown) are provided on the mould parts 12 and 13 for releasably locking the mould parts 12 and 13 when joined together.

The mould described is used in the following manner: Let it be assumed that the mould parts 12 and 13 are separated from each other and that both metal bands 24 lie flat against the front of the mould part 12 as illustrated in Fig. 4. Two tapes corresponding to the tape 1 of Fig. 3 are placed in the recesses 19 of the mould part 13, one in each, so that the thickened edge 3 of each tape engages the respective groove 20. The mould part 12 is then positioned on top of the mould part 13 so that the hinges 25 and brackets 26 of the mould part 12 engage the recesses 27 of the mould part 13 whereby the correct relative position of the two mould parts 12 and 13 is secured. The parts are then releasably locked together by any convenient locking means (not shown). The mould is suitably heated and liquefied thermoplastic material or a suitable liquefied metal or metal alloy is injected into the mould through the duct 22 in the mould part 12. The liquefied material flows through the longitudinal channel formed by the registering main channels 14 of the mould parts 12 and 13 into the branch channels 15 at both sides of the tapes and thence into the cavities or notches 16; it enters the said cavities or notches 16 at the respective shallow portions 17 thereof and flows around the thickened tape edge extending through the said cavities to form a row of fastener members around the thickened edge of each tape. If necessary or desired, pressure may be applied to the liquefied material from outside the mould in any convenient manner known in the art of injection moulding or die-casting. The mould is now allowed to cool and the liquefied material in the mould to solidify. After the material has become sufficiently solid, the mould is opened by separating the mould parts 12 and 13 from each other. Since the metal bands 24 extend slightly into the region of the notches 16 the liquefied material also flows around that edge of the respective metal band 24 which faces the main channel 14 and solidifies around said edge. Thus, the tapes and the fastener members formed thereon are retained on the mould part 12 when the mould is opened. By pushing the projecting ends of the ejector rods 28 towards the front of the mould part 12, the metal bands 24 are rotated to assume the position shown in the lower part of Fig. 6, whereby the tapes carrying the fastener elements are ejected from the mould part 12 and may easily be removed therefrom and from the edges of the metal bands 24, the removal of the tapes from the mould part 12 being facilitated by the constrictions 29 in the branch channels 15 (see Fig. 8) which cause the solidified material in the said branch channels to be weakened at the regions corresponding to the constrictions 29 so that the solidified material may easily be broken at these regions. Finally, the solidified material in the main channel 14 is removed, whereupon the mould parts 12 and 13 are ready for making another couple of stringers.

It will be appreciated that the head portions of the fastener members need not be polished or otherwise finished, any such finishing process, if required at all, being performed at the legs of the members or their extensions.

Many modifications of the mould described are possible. For example, each branch channel may have more or less than three constrictions 29. For instance, in some cases it is sufficient to provide each branch channel 15 only with one constriction, namely that nearest the portions 17. Alternatively, the constriction nearest each portion 17 may be omitted, in which case the solidified material corresponding to the portion 30 (Fig. 8) of each branch channel remains on the tape and serves decorative purposes. Moreover, the free ends of the material corresponding to the portions 30 indicate a line substantially parallel to the tape edge along which the fastener stringers may be sewn to an article in connection with which the fastener is to be used. This prevents that the stringers will be sewn on such articles along lines too near the fastener members or too remote therefrom and thereby ensures a proper operation of the finished sewn-on fastener. Again, the shallow portions 17 of the notches 16 need not be wider than the portions 18 but both these portions may be of the same width in which case members of the kind shown in Figs. 1 and 2 will be formed.

Figure 9:
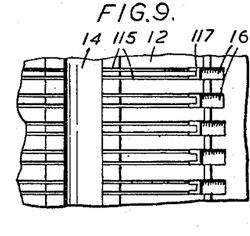
Figs. 9, 10, 11 and 12 are similar to Fig. 8 and illustrate modifications of the mould part of Fig. 5.

In order to facilitate the flow of liquefied material from the main channel 14 into the cavities or notches 16, each notch 16 may communicate through a plurality of branch channels with the main channel. For example, in the embodiment illustrated in Fig. 9, each notch 16 has a shallow portion 117 communicating with the main channel 14 through two parallel branch channels, 115. (The constrictions are, for simplicity, not shown.)

Figure 10:
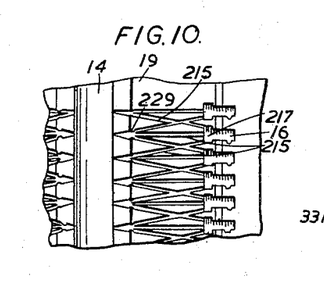

Fig. 10 illustrates an embodiment in which the shallow portion 217 of each notch 16 (except for the first and the last notch of each row of notches) communicates with the main channel 14 through three branch channels 215 some of which cross each other. Three branch channels 215, at the vicinity of the main channel, join one another and enter jointly the main channel 14 (except for the first and last point of entrance where only two branch channels join each other). In the embodiment illustrated in Fig. 10, constrictions 229 are provided at the places where branch channels join one another so that the material solidified in the branch channels may, at these places, be broken off from the material solidified in the main channel 14, the portions of the material which corresponds to the branch channels 215 remaining on the tape at both sides thereof and forming a web serving decorative purposes, the web interconnecting, and being integral with, extensions of adjacent fastener members. This material will be sufficiently thin so that the web does not substantially impair the flexibility of the sliding clasp fastener. If desired, additional constrictions may, of course, be provided immediately adjacent the portions 217, in which case the material corresponding to the branch channels 215 may be removed from the tape.

Figure 11:
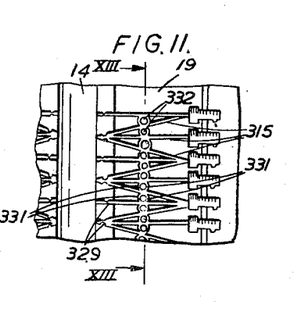
Figure 13:
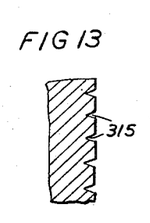
Fig. 13 is a sectional view on an enlarged scale along the line XIII—XIII of Fig. 11.
Figure 14:
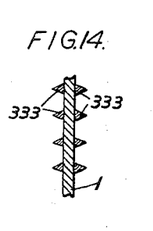
Fig. 14 is a section through part of a tape provided with a web made by means of the mould of Figs. 11 and 12.

In the embodiment shown in Figs. 11 and 13, adjacent branch channels 315 are interconnected by auxiliary channels 331. Constrictions 329 are provided at the vicinity of the main channel 14 for facilitating breaking off the material solidified in the branch channels 315 from that in the main channel 14 so that a web of solidified material remains at both sides of the tape, the pattern of such webs corresponding to the pattern formed by the branch channels 315 and the auxiliary channels 331. The auxiliary channels 331 further facilitate the flow of the liquefied material. Moreover, the studs 332 embraced by the auxiliary channels 331 will be reproduced as holes in the webs at both sides of the tapes and may serve as a guide for sewing the fastener stringers to an article, the sewing needle being passed through such holes either manually or by a sewing machine. Particularly if the stringers are sewn on by a sewing machine, the point of the sewing needle may encounter the web instead of passing through one of the holes in the web. In order to prevent, in such a case, breaking of the needle, the branch channels 315 and the auxiliary channels 331, or at least part thereof, may have a conical or otherwise tapering cross-section as shown in Fig. 13 whereby the web 333 (see Fig. 14) or at least that part thereof which surrounds the holes, has a comparatively broad base at the side of the cross-section nearest the tape 1 and is tapering or rounded off at the side remote from the said tape, so that the point of the sewing needle when encountering the web during the sewing process is deflected towards the tape.

Figure 12:
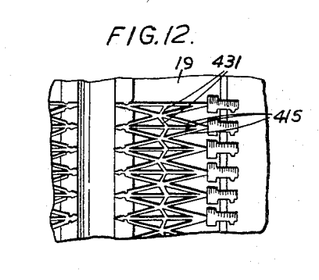

Fig. 12 illustrates a further embodiment of a mould part similar to that of Fig. 11 in which branch channels 415 intercommunicate through auxiliary channels 431. The material solidified in the auxiliary channels 431 indicates somewhat wavy lines in the webs of the fastener stringers made and may again serve as a guide for sewing the stringers to an article.

Figures 15, 16:
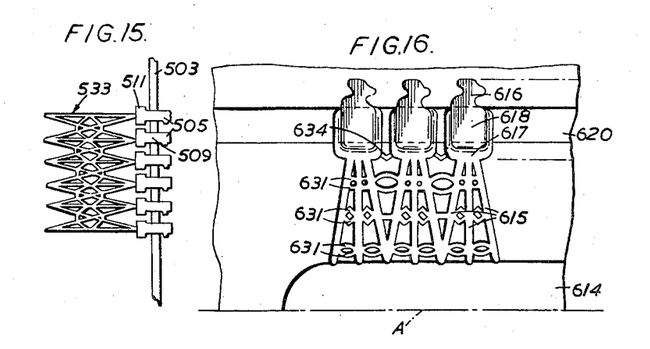
Fig. 15 illustrates part of a stringer of a tapeless sliding clasp fastener.
Fig. 16 is a top plan view of a portion of one of the mould parts for making a modified tapeless sliding clasp fastener.

Fig. 15 illustrates part of a stringer of a tapeless sliding clasp fastener which comprises a flexible cord or string 503, which is substantially non-elastic in its longitudinal direction. The cord or string 503 carries fastener members 505 formed in situ around the said cord or string, the fastener members 505 comprising legs 509 provided with extensions 511 which are thinner than the legs 509, the extensions 511 being interconnected by a web 533 moulded or die-cast of the same material as the fastener members and serving for sewing or otherwise attaching the tapeless fastener to an article in connection with which it is to be used. Again, in the finished sliding clasp fastener the slider rides on the extensions 511 as explained hereinbefore with reference to Figs. 1 and 2.

Of course the web need not have the specific pattern shown in Fig. 15 but may have any other suitable pattern, for example that shown in Fig. 11 or 12. A further suitable pattern is shown in Fig. 16, which illustrates a portion of one of the two mould parts for making stringers for tapeless sliding clasp fasteners and which will now be described.

The mould part illustrated in Fig. 16 has a main channel 614, a groove 620 extending in the longitudinal direction of the mould part for accommodating a cord or string such as shown at 503 in Fig. 15, notches 616 for forming the fastener members, each notch having a portion 618 corresponding to a fastener leg, and a portion 617 corresponding to an extension of the fastener member. Branch channels 615 communicate with the notches 616 and the main channel 614. Auxiliary channels 631 provide for intercommunications between the branch channels 615. Furthermore, supplementary channels 634 directly connect adjacent notches 616. Fig. 16 shows the arrangement at only one side (in Fig. 16, the upper side) of the main channel 614. At the other (in the Fig. 16, the lower) side of the main channel 614, a similar longitudinal groove, similar notches, branch channels, auxiliary channels, and supplementary channels are provided, so that the mould part is substantially symmetrical with respect to its longitudinal centre line A. The other mould part is, with respect to the various channels, notches, and grooves, an exact replica of the mould part of Fig. 16 so that when the mould parts are joined together corresponding channels and the like register with one another. Of course, in addition, the other mould part is provided with a duct and inlet leading to its main channel for introducing liquefied material into the mould, with metal bands, hinges and brackets for mounting them, and ejector rods for ejecting the formed stringers, while the mould part illustrated in Fig. 16 is provided with recesses (not shown) for accommodating the said hinges and brackets. Since all these means are identical with those described hereinbefore in detail with reference to Figs. 4 to 8, it is believed that in this respect no further description is required.

In use, two cords or strings are placed into the grooves 620 of one of the mould parts, one into each, and the two mould parts are joined together; liquefied material is introduced into the pre-heated mould, and is allowed to solidify. The mould is then opened, the solidified material ejected and broken off from the material solidified in the main channel 614. Thereby two stringers for a tapeless sliding clasp fastener are obtained, the stringers corresponding (apart from the somewhat different pattern of the web) to the stringer illustrated in Fig. 15.

If the web and the fastener members of the stringers are moulded from thermoplastic material, it is advisable to stretch the web after having been moulded beyond its limit of elasticity so as to render it substantially non-elastic, while it retains a sufficient degree of flexibility.

If the web and the fastener members are cast from a metal or metal alloy, it is often desirable to subject the members and the web to an electrolytical treatment to oxidize the members and the web at their surfaces, so that they may subsequently be suitably dyed. It will be appreciated that the metallic web and the metallic material solidified in the supplementary channels 634 of the mould electrically interconnect the members and offer a comparatively low ohmic resistance to the electric current. During the electrolytical treatment the flow of electric current through the web and the members is assured even after commencement of the superficial oxidization process.

In any case, no matter whether the members and the web are made of thermoplastic material or of metallic material, the material solidified in the supplementary channels 634 of the mould is finally cut or otherwise broken away so as not to impede the flexibility of the stringers. If the members and the web are made of metallic material, and if it is desired to oxidize them at their surfaces electrolytically, then the material solidified in the supplementary channels 634 of the mould is cut or otherwise broken away after such electrolytical treatment.

In all the moulds so far described, the liquefied material was caused to flow in a direction substantially perpendicular to the tape edges from a centrally arranged main channel through branch channels across the tapes into the cavities or notches for forming the fastener members. It is, however, possible to cause the material to flow over the tapes into such cavities or notches in a direction substantially parallel to the tape edges. A mould part of such a mould is illustrated in Figs. 17 to 19, which will now be described.

Figure 17:
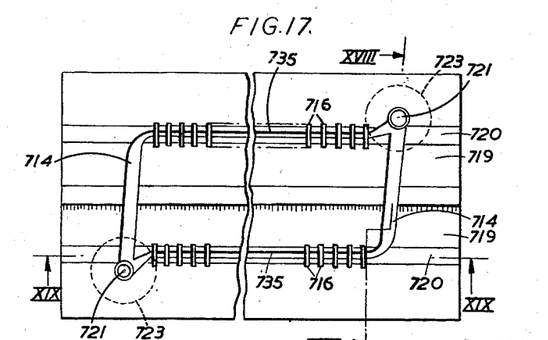
Fig. 17 is a top plan view of one of the mould parts of another embodiment of a mould for making sliding clasp fasteners.
Figure 18:
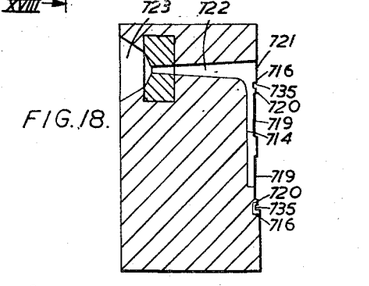
Fig. 18 is a sectional view along the line XVIII—XVIII of Fig. 17.
Figure 19:
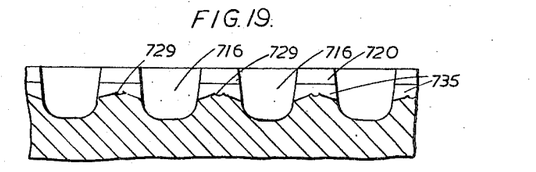
Fig. 19 is a sectional view along the line XIX—XIX of Fig. 17.

The mould part illustrated in Figs. 17 to 19 has two recesses 719 extending in the longitudinal direction of the mould part for receiving two tapes, and two grooves 720 for accommodating the thickened edge of a tape. Each groove 720 is provided with a row of notches 716 extending, at one side of the groove 720, somewhat into the respective adjoining recess 719 and, at the other side of the groove 720, somewhat beyond the said groove. The notches 716 of each row communicate laterally with one another by a distributing channel 735. The distributing channels 735 are somewhat deeper than the grooves 720, but somewhat shallower than the notches 716. The distributing channels are, between adjacent notches, provided with constrictions 729 as indicated in Fig. 19. The two distributing channels 735 merge, at each end thereof, into a main channel 714 which is essentially deeper than the recesses 719 and the grooves 720. From Fig. 17, it will be recognised that the two distributing channels 735 together with the two main channels 714 form a closed pathway roughly in the shape of a parallelogram whose opposite longer sides are formed by the two distributing channels 735 and whose opposite shorter sides are formed by the two main channels 714. At two diagonally opposite corners, the said pathway has two inlets 721, one at each of these corners, each inlet leading to a duct 722 (see Fig. 18) having a funnel-shaped part 723 communicating with the outside of the mould part at the rear thereof. The other mould part has similarly arranged recesses, grooves, notches, distributing channels, and main channels, which respectively register with the corresponding recesses and the like of the first mould part when the mould parts are joined together. However, the pathway of the said other mould part does not have any inlet. Likewise, the ducts, including their funnel-shaped parts, are omitted. On the other hand, if desired, one of the mould parts may be provided with two metal bands, hinges, brackets for mounting them, and ejector rods, and the other with recesses for receiving the hinges and brackets. These means are the same as those described hereinbefore with reference to Figs. 4 to 8 and are believed to need no further description.

In use, two tapes are inserted into the recesses 719, one into each, of one of the mould parts with their thickened edges accommodated in the grooves 720. The mould parts are then joined together, and liquefied material is introduced into the mould through the ducts 722. It flows through the pathway formed by the main channels 714 and the distributing channels 735 and is distributed therefrom to flow into the cavities or notches 716 forming fastener members around the thickened tape edges. After the material has solidified, the tapes, with the fastener members formed thereon, are removed from the mould. The fastener members are interconnected by material solidified in the distributing channels 735.

If the members are made of metal or a metal alloy, and if it is desired to subject the members to an electrolytical treatment, the material solidified in the distributing channels 735 may serve as an electric conductor interconnecting the row of fastener members on the tape electrically. Again, it will be appreciated that this material effects a good electrical interconnection offering a comparatively low ohmic resistance to the current, which is not substantially affected when a superficial oxidization commences.

In any case, that is if the members are made of thermoplastic material, or if they are made of metallic material which it is not intended to treat electrolytically, or if they are made of metallic material and have been treated electrolytically, that part of the material which has solidified in the distributing channels is broken away at the constriction 729 so that the flexibility of the finished fastener is not impeded. A portion of a stringer of such a fastener is illustrated in Fig. 20, each of the lateral extensions 211 on the legs 209 corresponding to material solidified in the distributing channels 735 between a constriction 729 thereof and an adjacent notch 716. Of course, the lateral extensions 211 need not be perpendicular to the respective surfaces of the legs of the members, but may, with a suitable modification of the mould, be inclined to such surfaces; they may, for example, traverse the rectangular space between adjacent members in a diagonal direction.

Figure 21:
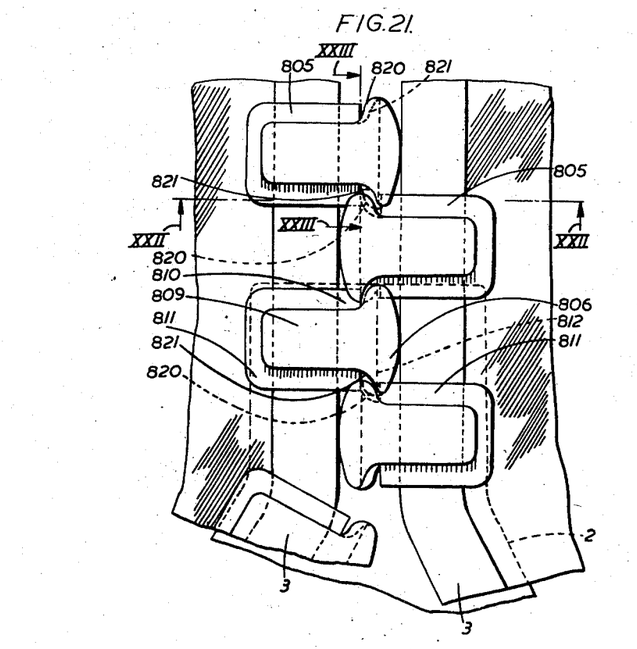
Fig. 21 illustrates part of another embodiment of a sliding clasp fastener.
Figure 22:
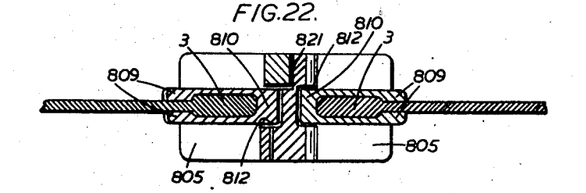
Fig. 22 is a section through the fastener of Fig. 21 along the line XXII—XXII.
Figure 23:
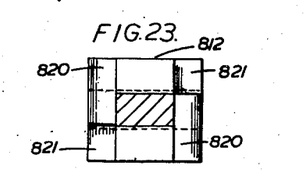
Fig. 23 is a section through a single interlocking member along the line XXIII—XXIII of Fig. 21.

Figs. 21 to 23 which will now be described illustrate another embodiment of a sliding clasp fastener of the invention. The tapes 1 of the fastener are each provided with a thickened edge 3 around which fastener members 805 are formed in situ. Each leg 809 of a member is provided with an extension 811 which is thinner than the leg 809 and surrounds the leg at each side of the tape as shown in Fig. 21. The extensions 811 of each member 805 protrude beyond the tape 1 and its thickened edge 3 and merge into one another at 810 (see Figs. 21 and 22). The metal band hereinbefore described for ejecting the members from the mould forms a groove 812 in the head portion 806 of each member which groove engages, when the fastener is closed, the extensions 811 of the adjacent members at 810 where the extensions project beyond the tape. In section, the head portion 806 has a shape somewhat similar to a mushroom and is provided at its underside with two coupling projections 820 and two coupling recesses 821, the projections of one member engaging the recesses of an adjacent member. With this construction each member (except the first and last members) is four times interlocked with the two adjacent members, namely twice by means of the projections 820 and recesses 821 and twice by the interengagement of the groove 812 with the extensions 811. Thereby, a particularly well closing fastener is obtained, while the extensions 811 are so thin that they are flexible and do not essentially decrease the flexibility of the closed fastener. Again, the slider 2 rides on the extensions 811.

I claim:

1. A sliding clasp fastener comprising a pair of flexible carrier tapes, a row of fastener members on each carrier tape, a pair of legs on each of said fastener members, each pair of legs gripping the carrier tape between them so that each fastener member with its legs straddles across an edge of the said carrier tape, a head portion on each of said fastener members, the said head portion protruding beyond the said edge of the carrier tape and having two surfaces substantially perpendicular to the edge of the carrier tape, each of said surfaces having at least one coupling recess, at least one coupling projection on each of said surfaces, the said coupling recesses and projections of each fastener member of each row being in shape substantially complementary to each other and each being arranged for interlocking with a coupling projection and recess respectively of an adjacent fastener member of the other row, a lateral extension on each leg of each fastener member, the extension being thinner than the leg and extending perpendicularly to the edge of the carrier tape in the longitudinal direction of the leg, and a portion on each extension protruding beyond the edge of the carrier tape, each fastener member having a front surface joining the said perpendicular surfaces, the said front surface having a groove substantially parallel to the edge of the carrier tape, the said groove of each fastener member of each row being arranged for receiving the protruding portion of an extension of an adjacent fastener member of the other row whereby additionally to interlock the fastener members of one row with an adjacent fastener member of the other row.

2. A sliding clasp fastener as claimed in claim 1, wherein adjacent protruding portions of the extensions of each fastener member merge into each other beyond the edge of the carrier tape.

MARTIN WINTERHALTER.

(References on following page)

REFERENCES CITED

The following references are of record in the file of this patent:

UNITED STATES PATENTS

| Number | Name | Date |
|---|---|---|
| 1,731,667 | Johnson | Oct. 15, 1929 |
| 1,857,309 | Jacobs | May 10, 1932 |
| 2,131,255 | Naunton et al. | Sept. 27, 1938 |
| 2,218,090 | Marinsky et al. | Oct. 15, 1940 |
| 2,331,618 | Morin | Oct. 12, 1943 |
| 2,353,106 | Winterhalter | July 4, 1944 |
| 2,374,292 | Kuna | Apr. 24, 1945 |
| 2,397,331 | Winterhalter | Mar. 26, 1946 |
| 2,403,739 | Morin | July 9, 1946 |
| 2,439,433 | Kuzmick | Apr. 13, 1948 |

FOREIGN PATENTS

| Number | Country | Date |
|---|---|---|
| 225,905 | Great Britain | of 1924 |
| 430,724 | Great Britain | of 1935 |
| 627,793 | Germany | of 1936 |